T. E. GALLUP.
ATTACHMENT FOR VEHICLE THILLS.
APPLICATION FILED APR. 9, 1910.
986,704.
Patented Mar. 14, 1911.
2 SHEETS—SHEET 1.
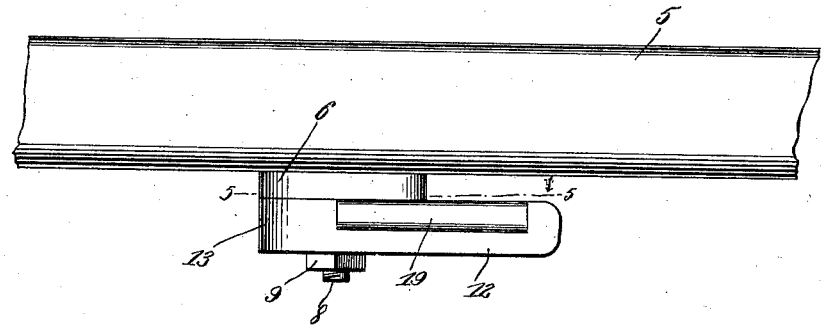
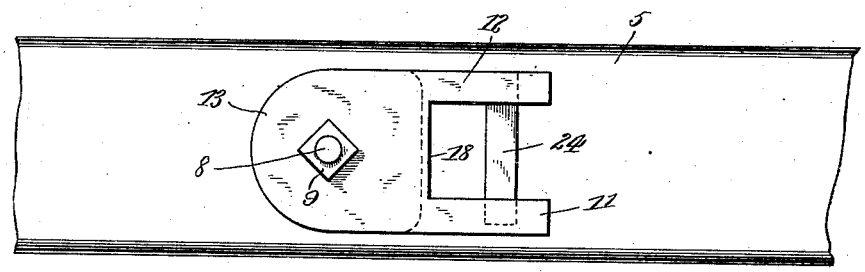
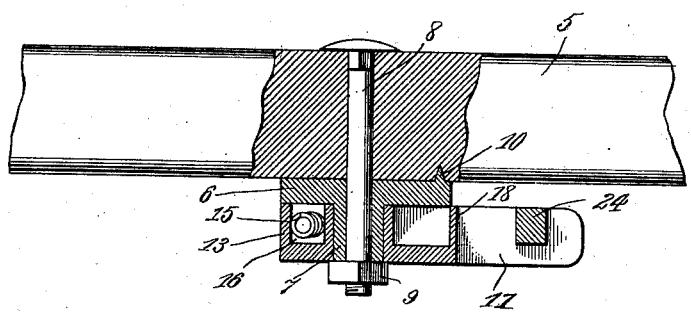
Witnesses
J. H. Crawford.
Inventor
Thomas E. Gallup,
By Victor J. Evans
Attorney T. E. GALLUP.
ATTACHMENT FOR VEHICLE THILLS.
APPLICATION FILED APR. 9, 1910.
986,704.
Patented Mar. 14, 1911.
2 SHEETS—SHEET 2.
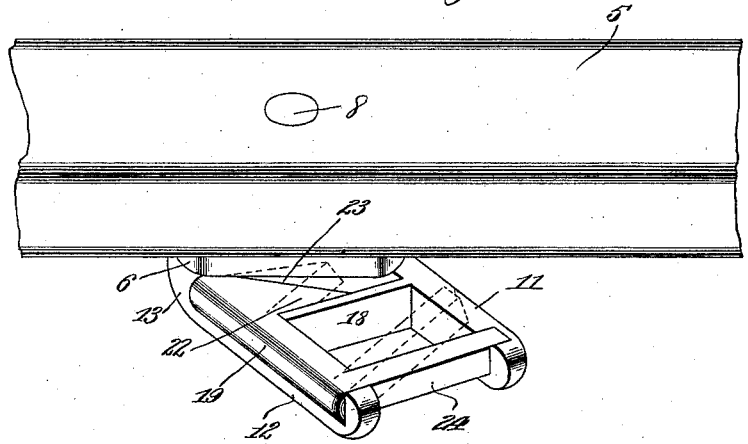
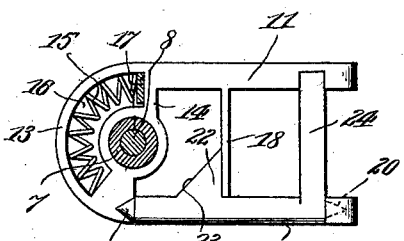
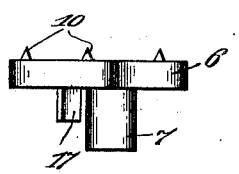
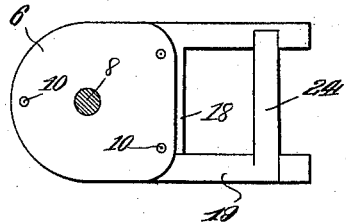
Witnesses
J. C. Crawford.
John A. Donegan
Inventor
Thomas E. Gallup,
By Victor J. Evans
Attorney

UNITED STATES PATENT OFFICE.

THOMAS E. GALLUP, OF SANTA CLARA, CALIFORNIA.

ATTACHMENT FOR VEHICLE-THILLS.

986,704.  Specification of Letters Patent.  Patented Mar. 14, 1911.

Application filed April 9, 1910.  Serial No. 554,465.

*To all whom it may concern:*

Be it known that I, THOMAS E. GALLUP, a citizen of the United States, residing at Santa Clara, in the county of Santa Clara and State of California, have invented new and useful Improvements in Attachments for Vehicle-Thills, of which the following is a specification.

This invention relates to improvements in attachments for vehicle thills and has particular reference to that class of attachments known as hold-backs.

The invention has for one of its objects to facilitate the attachment and removal of the hold-back strap from the strap holder.

Another object is the provision of a hold back strap holder which will, in the event of the operator neglecting to disengage the hold-back strap at the time of unhitching, automatically disengage from the hold-back strap when the thills are lowered to the ground.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

In the accompanying drawings, forming a part of the specification:—Figure 1 is a side elevation of the device showing its application to the thill of a vehicle. Fig. 2 is a bottom plan view of the same. Fig. 3 is a vertical sectional view of the device also showing the thill partly in section. Fig. 4 is a detail perspective of the device showing the same swung outwardly from the thill and in position to disengage or receive the hold-back strap. Fig. 5 is a sectional plan view approximately on the line 5—5 of Fig. 1. Fig. 6 is a top plan view of the device. Fig. 7 is a detail side elevation of the attaching plate.

Similar numerals of reference are employed to designate corresponding parts throughout.

For purposes of illustration I have shown the device applied to the right hand thill of a vehicle. It must be understood, however, that the left hand thill which is not shown will be likewise provided with the device. The thill is designated by the numeral 5 and is of well-known construction and the device about to be described is located on the lower surface of the thill.

What will subsequently be termed an attaching plate is designated by the numeral 6. This member is preferably of metal and is oblong in contour and substantially rectangular in cross section, corresponding in width approximately to the width of the thill and arranged in the direction of the length of the thill. Depending from the central portion of the lower face of the attaching plate is a bushing 7, which receives a bolt 8 extending through a vertical opening formed in the thill, the lower end of the bolt having secured thereon a nut 9 which serves to secure the attaching plate to the thill. That surface of the attaching plate bearing on the lower face of the thill is provided with a plurality of spurs 10, which embed in the thill to prevent movement of the attaching plate.

What will subsequently be termed a frame is shown to include in its construction a pair of side bars 11 and 12, connected together at one end by a semi-circular end piece 13. The frame thus formed is somewhat greater in length than the length of the attaching plate and the inner side 14 of the curved end piece 13 extends to points between the middles and connected ends of the sides 11 and 12. The end piece 13 is provided adjacent to its inner side 14 with an opening to receive the bushing 7 depending from the attaching plate 6, the thickness of the said end piece corresponding approximately to the length of the bushing. The frame is loosely connected to the bushing 7, whereby it may be swung laterally to the position shown in Fig. 4. In order that the frame may be held parallel with the length of the shaft and attaching plate 6, a helical compression spring 15 is employed. This member is positioned in a curved recess 16 formed on that face of the end piece 13 bearing on the attaching plate 6 and has one end bearing on one end wall of the recess while its opposite end engages with a depending tongue 17 carried by the lower face of the attaching plate 6 and of a size to fit within the recess 16, as clearly shown in Fig. 5. With this construction it will be evident that the parts will be yieldingly held in position, as shown in Figs. 1 to 3 inclusive and 5 and 6, and when the frame is moved to the position shown in Fig. 4 the spring 16 will be compressed, whereupon the frame will be returned to its normal position when the frame is released. The medial portions of the sides 11 and 12 are connected by a cross piece 18, and the side 12 or that adjacent to the inner side of the thill 5 is provided with a longitudinal recess extending for the major portion of the length of the side.

What will subsequently be termed a strap holder is shown to include a side portion 19, somewhat greater in length than the length of the recess in the side 12, its opposite ends being cone-shaped, as shown at 20 and 21. One of said ends being journaled in a tapered recess formed in the upper face and on the straight side 14 of the end piece 13, while the opposite end is journaled in a tapered opening in the outer end wall of the recess of the side 12. The thickness of the side 19 corresponds to the depth of the recess in the side 12, so that the upper face of said side will coincide with the upper face of the opposite side 11 of the frame. The inner end portion of the side 19 or that adjacent to the pivotal point of the frame is provided with an inwardly extending lug 22, one side of which bears on the inner side of the cross piece 18 and the opposite side of which is sheared, as shown at 23. The lug extends inwardly to a point adjacent the middle of the cross piece 18 and with this structure it will be evident when the frame is parallel with the thill and attaching plate 6, that the lug will bear on the said attaching plate, whereby upward and outward movement of the side 19 will be prevented. When the frame, however, is moved outwardly against the tension of the spring 16, as before described, the sheared side 23 of the lug will move beyond the inner side of the attaching plate, thus permitting the side to be moved upwardly and outwardly as shown by dotted lines in Fig. 4. Extending at right angles from the one end portion of the side 19 is a cross piece 24, corresponding in thickness to the thickness of the side 19 and corresponding in length, approximately, to the width of the frame. The free end of the cross piece 24 is received by a socket formed in the free end portion of the side 11 of the frame. The cross piece 24 is adapted to receive the loop of the hold-back strap when moved to the position as shown by dotted lines in Fig. 4, after which it is released and moves into the socket and into the position as shown in full lines in Fig. 4, so that when the frame is released and moves under the thill by the action of the spring 16, accidental disengagement of the hold-back strap will be prevented.

It will be observed when the frame is parallel with the thill and the hold-back strap in engagement with the strap holder, as before described and the operator fails to disengage the hold-back strap from the cross piece 24 it will be evident when the thills move downwardly the hold-back strap will move the frame inwardly until the lug clears the attaching plate 6, whereupon the strap holder will move upwardly and outwardly and out of engagement with the loop of the hold-back strap.

From the foregoing, it is evident that I have provided a device which is comparatively simple in structure and inexpensive in manufacture, embodying few parts and these so arranged that the danger of derangement will be reduced to a minimum.

I claim:—

1. In a hold-back the combination with a thill, of a frame pivotally connected with the thill, a strap holder pivoted to the frame and movable in a plane perpendicular to the movement of the frame when the latter is at an angle to the thill.

2. In a hold-back, an attaching plate, a frame pivoted to the attaching plate, a strap holder having a side portion pivoted to one side of the frame, and an end portion engageable by the other side of the frame.

3. In a hold-back, an attaching plate, a frame pivoted to the attaching plate, a strap holder having a side portion pivoted to one side of the frame, an end portion receivable by the opposite side of the frame, and a lug to engage with the attaching plate and prevent movement of the holder when the latter is parallel with the attaching plate.

In testimony whereof I affix my signature in presence of two witnesses.

THOMAS E. GALLUP.

Witnesses:
ROBERT A. FATJO,
LUIS G. FATJO.

---

Copies of this patent may be obtained for five cents each, by addressing the "Commissioner of Patents, Washington, D. C."